UNITED STATES PATENT OFFICE.

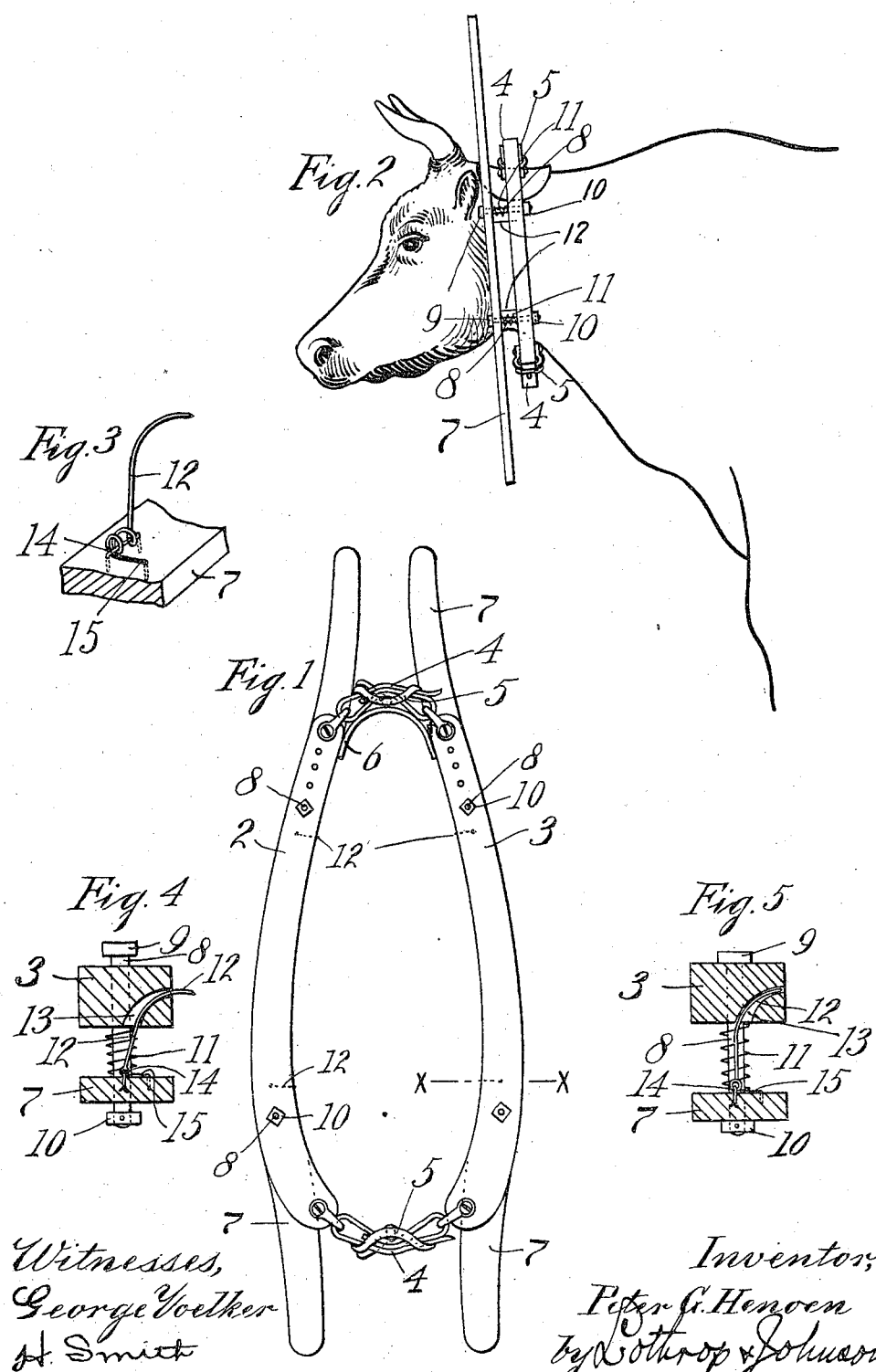

PETER G. HENOEN, OF LEEDS, NORTH DAKOTA.

CATTLE-CHECK.

965,297. Specification of Letters Patent. Patented July 26, 1910.

Application filed March 22, 1909. Serial No. 484,950.

*To all whom it may concern:*

Be it known that I, PETER G. HENOEN, a citizen of the United States, residing at Leeds, in the county of Benson and State of North Dakota, have invented certain new and useful Improvements in Cattle-Checks, of which the following is a specification.

My invention relates to improvements in cattle-checks, its object being to provide improved means for preventing cattle from trying to force their heads through fence openings, and the like.

To this end the invention consists in the construction, combination and arrangement of parts hereinafter described and claimed.

In the accompanying drawings forming part of this specification, Figure 1 is a front view of the cattle check; Fig. 2 is a side view thereof in place upon the neck of an animal; Fig. 3 is a perspective view of one of the spurs or needles with a fragment of the guard member upon which it is secured, and Figs. 4 and 5 are cross sections on line $x$—$x$ of Fig. 1, with the needle in out-thrust and retracted positions, respectively.

In the drawings 2 and 3 represent the opposite members of a collar which fits about the neck of the animal. These members are flexibly and detachably connected at top and bottom by means of straps 4 having fastening buckles 5. The upper buckle carries a pad 6 to rest upon the top of the animal's neck.

Movably supported upon the faces of the collar members are a pair of guard members 7, each of which is movable independently of the other. The guard members extend beyond the collar members at top and bottom a sufficient distance to be engaged by the wires or rails between which the animal thrusts its head.

In the embodiment of the invention shown in the drawings, the guard bars are entirely separate and unconnected with each other and are slidingly supported upon the collar members by means of pins or bolts 8, which pass freely and loosely through one or both of the opposing collar and guard members, preferably both as shown in Fig. 4. The pins are provided at their ends with retaining heads or nuts 9 and 10. The guard members are held normally thrust forward from the collar members in extended position by means of springs 11 interposed between the opposing collar and guard members.

Pivotally and elastically secured to each guard member are curved needles or spurs 12, which extend into, and work within, holes 13 in the collar members. These holes enter the forward face of the collar member, and, turning through an angle of about ninety degrees, emerge from the inner side of the collar member. The sides of the hole are preferably curved in order better to guide and force the needle in and out as the guard and collar members work toward and away from each other, and the hole is enlarged at the end where the needle enters in order to allow the needle free play. The needle is held normally in retracted position, as shown in Fig. 5, both by the spring 11 which holds the guard and collar members normally sprung apart, and by its own spring connection with the guard member whereby it is held sprung back against the inner wall of the hole 13. In the drawings the needle is shown elastically secured to the guard member by being looped around a pivot bar 14 upon the guard and having its inner end 15 arranged to bear against the face of the guard at right angles with its outer or acting end.

In use the collar members are fastened about the neck of the animal with the guard members in advance in position to be engaged by the wires or rails between which the animal tries to force its head. By pressing the guard against the fence wires or rails the animal will force the guard and collar together against the pressure of the springs 11, whereby the points of the needles 12 will be thrust sidewise out of their holes 13 so as to prick the neck of the animal.

By having both collar and guard members slidable upon the pins 8, these members will work more freely and with less likelihood of their being jammed.

As the two guard members are movable independently of each other, each member will respond freely to a very slight pressure exerted on that side only of the device and will not be held back by the other member upon which no pressure is exerted. Thus the device is extremely sensitive.

I claim as my invention:

1. A cattle check comprising a collar adapted to fit about the neck of an animal; a pair of guard members movably and elastically supported upon the face of the collar, each guard member being independent of, and unconnected with, the other guard member, and a needle carried by each guard member and extending slidably through the collar from the outer face thereof to the inner side thereof.

2. A cattle check comprising a pair of independent but flexibly connected collar members, a guard member movably and elastically supported upon the face of each collar member, each guard member being independent of, and unconnected with, the other guard member, and a needle carried by each guard member and extending slidably through its supporting collar member from the outer face thereof to the inner side thereof.

3. A cattle check comprising a collar adapted to fit about the neck of an animal, a pair of guard members movably and elastically supported upon the face of the collar, each guard member being movable independently of the other guard member, and a needle operatively connected with each guard member and working in the collar so as to be capable of projection beyond the inner side thereof.

4. A cattle check comprising a pair of independent but flexibly connected collar members, a guard member movably and elastically supported upon the face of each collar member, each guard member being movable independently of the other guard member, and a needle operatively connected with each guard member and working in the collar member supporting the same so as to be capable of projection beyond the inner side of said collar member.

In testimony whereof I affix my signature in presence of two witnesses.

PETER G. HENOEN.

Witnesses:
ARTHUR P. LOTHROP,
H. SMITH.